United States Patent [19]

Quirin

[11] Patent Number: 5,135,593
[45] Date of Patent: Aug. 4, 1992

[54] PROCESS FOR THE PRODUCTION OF A HEADREST WITH AN ARTICULATED INSERT AND APPARATUS FOR PRACTICING THIS PROCESS

[75] Inventor: Paul Quirin, Illkirch-Graffenstaden, France

[73] Assignee: Roth Freres, S.A., Strasbourg, France

[21] Appl. No.: 649,559

[22] Filed: Feb. 1, 1991

[30] Foreign Application Priority Data

Feb. 16, 1990 [FR] France .................. 90 02080

[51] Int. Cl.⁵ .................. B32B 5/20; B28B 1/48
[52] U.S. Cl. .................. 156/78; 156/251; 264/46.7; 264/154; 297/DIG. 1
[58] Field of Search .................. 297/408, DIG. 1; 156/251, 515, 78, 155; 264/154, 293, 467; 83/171

[56] References Cited

U.S. PATENT DOCUMENTS

| | | | |
|---|---|---|---|
| 2,972,669 | 2/1961 | Brown | 83/171 |
| 3,258,511 | 6/1966 | McGregor, Jr. | 264/46.7 |
| 3,396,616 | 8/1968 | Wright | 83/171 |
| 3,618,439 | 11/1971 | Zelnick | 83/171 |
| 3,833,696 | 9/1974 | Kramer | 156/78 |
| 3,985,996 | 10/1976 | Fischer | 83/171 |
| 4,485,295 | 11/1984 | Kellermeyer | 156/251 |
| 4,738,809 | 4/1988 | Storch | 297/DIG. 1 |
| 4,891,081 | 1/1990 | Takahashi | 156/78 |
| 4,908,170 | 3/1990 | Kurimoto | 264/46.7 |
| 4,960,479 | 10/1990 | Yasuda et al. | 156/251 |

FOREIGN PATENT DOCUMENTS

| | | | |
|---|---|---|---|
| 1270788 | 6/1968 | Fed. Rep. of Germany . | |
| 51-38186 | 3/1976 | Japan | 83/171 |
| 51-38187 | 3/1976 | Japan | 83/171 |
| 54-3189 | 2/1979 | Japan . | |
| 530252 | 12/1972 | Switzerland . | |

*Primary Examiner*—Michael W. Ball
*Assistant Examiner*—Daniel J. Stemmer
*Attorney, Agent, or Firm*—Young & Thompson

[57] ABSTRACT

A process for the production of a headrest with an articulated insert, comprises casting in situ polyurethane foam (7) within an external cover in which is disposed an insert (5) having articulated legs (4) that protrude from the cover, then hollowing out, by means of heating elements (2), swinging spaces (3) for the articulated legs (4) of the insert (5) by hot fusion of the external cover (6) and of the polyurethane foam (7) at the corresponding locations (8) of the headrest (1), and simultaneously heat sealing the external cover (6) and the surface of the polyurethane foam (7) bordering the swinging spaces (3). Apparatus for carrying out this process comprises a holding support for supporting thereon a headrest of polyurethane foam having embedded therein an insert (5) having articulated legs (4) protruding from the insert, and a structure (12) movable parallel to the legs (4) of the insert (5), and comprising two arms (13) each provided, at one of its ends, with a heating element (2) connected to a source of electricity.

3 Claims, 3 Drawing Sheets

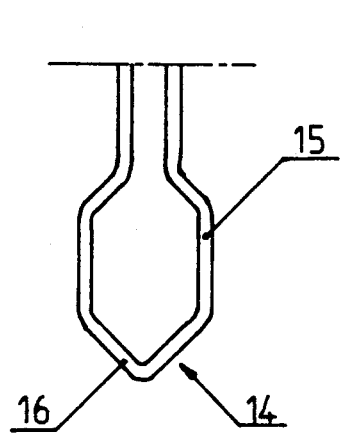
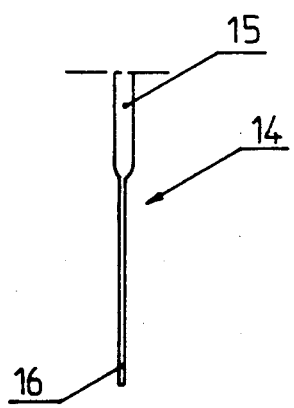
Fig. 2  Fig. 3
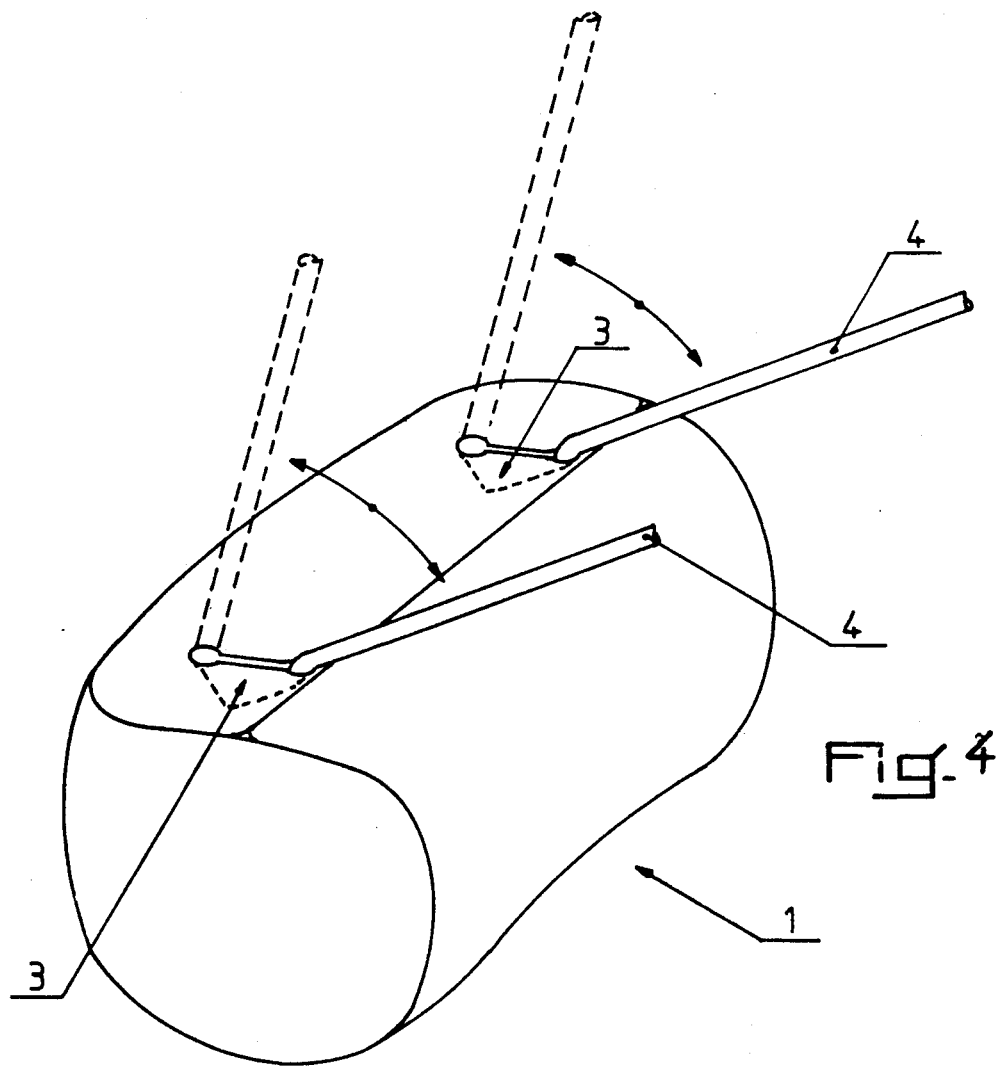
Fig. 4

U.S. Patent        Aug. 4, 1992        Sheet 3 of 3        5,135,593
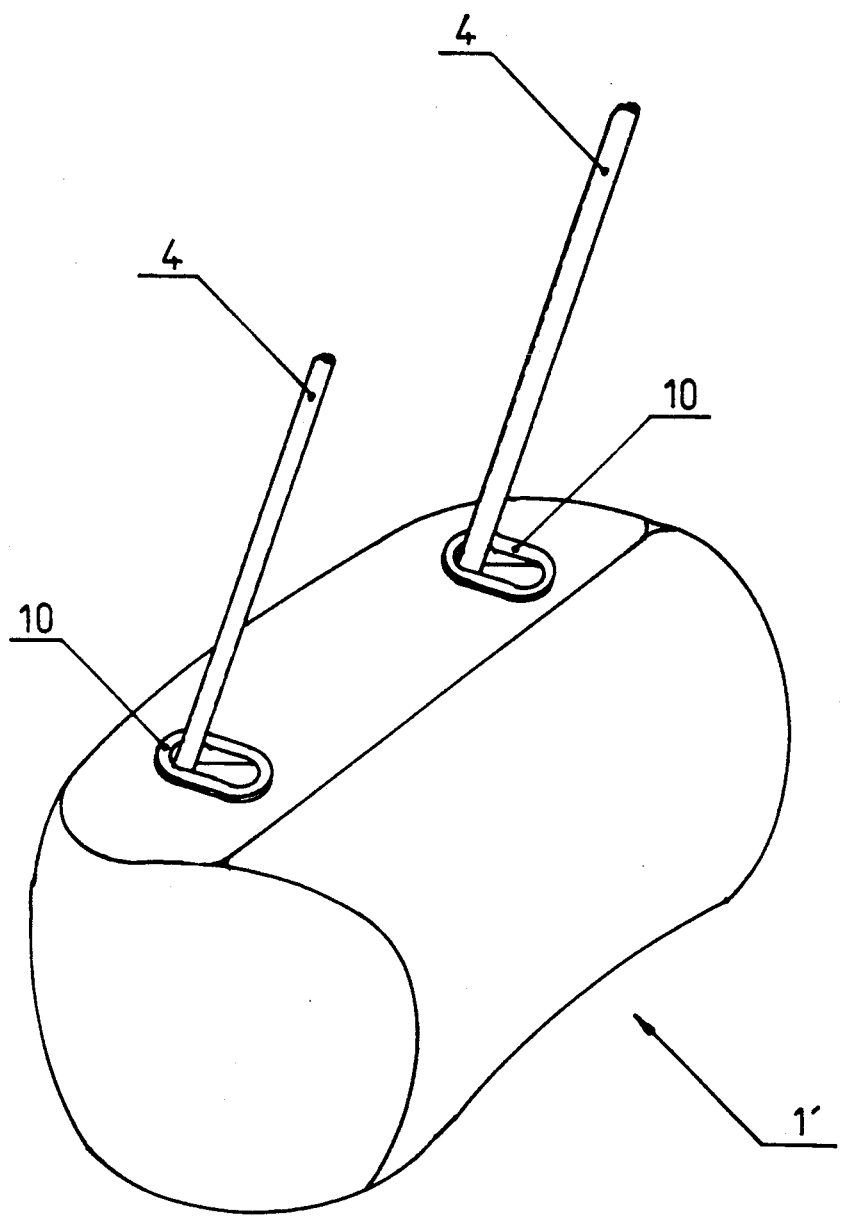
PRIOR ART                              Fig. 5

PROCESS FOR THE PRODUCTION OF A HEADREST WITH AN ARTICULATED INSERT AND APPARATUS FOR PRACTICING THIS PROCESS

FIELD OF THE INVENTION

The present invention relates to the field of the manufacture of automobile accessories, and has for its object a process for the production of a headrest with an articulated insert as well as an apparatus for practicing this process.

BACKGROUND OF THE INVENTION

At present, the production of a headrest by casting in situ a mixture of polyurethane consists in the first instance in producing by sewing or cementing a cover, constituting an external envelope of the headrest, in cloth, PVC or leather, placing this cover in a conforming mold, casting within this cover a foaming mixture of polyurethane which, after expansion, entirely fills said cover, and, finally, demolding, after polymerization of said foaming mixture, the covered headrest thus obtained.

Nevertheless, before casting the foaming mixture, it is indispensable to place within the cover a metallic insert generally constituted by a metallic rod in the shape of a horseshoe embedded in the polyurethane foam, but the ends of whose legs emerge from the base of the headrest. These two ends slide within the upper end of the seat back. There is thus obtained a headrest adjustable in height by sliding, but not inclinable forwardly and rearwardly relative to the back.

To obtain an inclinable headrest, it is necessary to provide each of the two legs of the insert with an articulation. These two articulations are generally located for aesthetic reasons and for efficiency, entirely within the interior of the headrest, but immediately adjacent the point of emergence of the two legs of the insert to the outside of the headrest.

Moreover, to permit the swinging of the articulated legs in the headrest at the level of the articulations, it was absolutely necessary on the one hand to provide suitable slots in the external covering of the headrest and, on the other hand, to prevent any penetration of polyurethane foam into the space in which said articulated legs swing.

To this end, it is at present indispensable to provide about these articulations protective frames, ordinarily of injected plastic material, on the one hand, to prevent, during casting in situ of the polyurethane foam, and more particularly, at the end of expansion of said foaming mixture, any loss of foam into the slots preliminarily provided in the external covering and, on the other hand, to delimit during casting in situ and during the expansion phase of the foaming mixture, the future spaces for swinging of said articulated legs.

The major drawback of these protective frames is their high cost, which of course increases the total sale price of the headrest.

SUMMARY OF THE INVENTION

The problem solved by the present invention consists accordingly in providing a headrest with an articulated insert, by casting in situ, without first providing swinging slots in the external covering nor swinging spaces in the foam, and also without use of a protective frame, thereby simplifying the production of said headrests.

The problem is nicely solved thanks to the process of production of a headrest with articulated insert according to the invention, characterized in that it consists in providing in the first instance a headrest provided with an articulated insert according to the process of production of a headrest provided with a non-articulated insert, particularly by casting in situ a mixture of polyurethane foam, then in hollowing out by means of heating elements the swinging spaces for the articulated legs of the insert by hot melting of the external covering and the polyurethane foam at the corresponding locations on the headrest, and simultaneously in heat sealing the external covering and the polyurethane foam about said spaces for swinging.

The invention also has for its object an apparatus for practicing the process of production of a headrest with articulated insert, characterized in that it is principally constituted by a structure movable in at least one given direction, particularly parallel to the legs of an insert of a headrest disposed on a related support and comprising two articulated arms each provided at one of their ends with heating elements connected to an electric supply.

BRIEF DESCRIPTION OF THE DRAWINGS

The invention will be better understood from the following description, which relates to a preferred embodiment given by way of non-limiting example and explained with reference to the accompanying schematic drawings, in which:

FIG. 2 is a detail side elevational view of a heating blade which is part of the apparatus shown in FIG. 1;

FIG. 3 is a front elevational view of the heating blade shown in FIG. 2;

FIG. 4 is a perspective view of a headrest obtained by the method of manufacture according to the invention, and FIG. 5 is a perspective view of a headrest according to the prior art provided with protective frames.

DESCRIPTION OF THE PREFERRED EMBODIMENT

Figure 1:
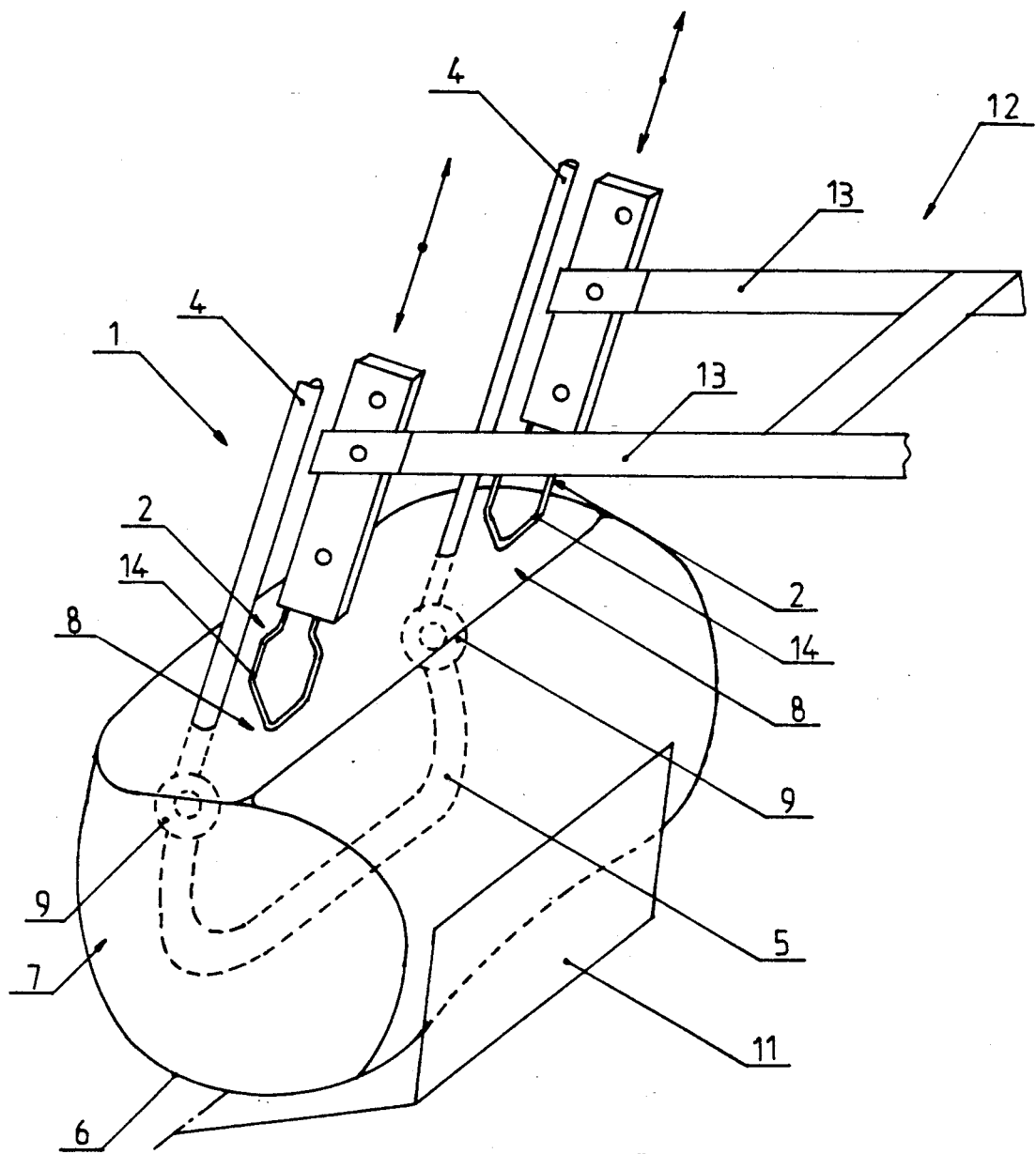
FIG. 1 is a perspective view of a headrest as well as a portion of the apparatus for practicing the process according to the invention during the stage of providing the spaces for swinging in a headrest.

According to the invention, the process for the production of a headrest with an articulated insert consists in providing in the first instance a headrest 1 provided with an articulated insert 5, according to the process of production of a headrest with a non-articulated insert, particularly by molding in situ a mixture of polyurethane foam 7, then in hollowing out, by means of heating elements, the swinging spaces 3 of the articulated legs 4 of the insert 5 by hot melting of the external covering 6 of the polyurethane foam 7 at the corresponding positions 8 of the headrest 1, and in simultaneously hot fusing the external envelope 6 and the polyurethane foam 7 at the location of these swinging spaces 3.

The provision of the swinging spaces 3 therefore is subsequent to the phase of production of the headrest 1 by casting in situ a mixture of polyurethane foam 7. Thus, it is not necessary, during said casting in situ and during the following phase of expansion of the foam 7, to delimit about the articulations of the legs 4 of the insert 5, the swinging spaces 3, by the preliminary positioning for example of protective frames 10.

Moreover, the heat sealing of the external covering 6, which may for example be of cloth, polyvinylchloride or leather, and of the foam 7 at the surfaces delimiting the swinging spaces 3, permits these latter to be subjected to deformation and scraping during swinging of the legs 4 of the insert 5, without crumbling.

According to a first characteristic of the invention, shown partially in FIG. 1 of the accompanying drawings, the provision of swinging spaces 3 comprises in the first instance placing the headrest 1 on a holding support 11, such that the locations 8 to be hollowed out will be accessible, then bringing heating elements 2 to a temperature permitting hot fusion, inserting said heating elements 2 into the headrest 1 at the location of the positions 8 to be hollowed out to a depth which is a function of the implanted articulated insert 5, and finally withdrawing the heating elements 2 when the predetermined depth is achieved, and removing the headrest 1 thus produced from the holding support 11.

All of these operations can be carried out, for example, at a particular work station.

According to another characteristic of the invention, the speed of penetration of the heating elements 2, during hollowing out the swinging spaces 3 by hot fusion, is of the order of 1 cm/sec. and the speed of retraction of said elements 2 of the order of 10 cm/sec., the heating elements 2 being held at a temperature of about 280° C. during hot fusion.

The invention also has for its object an apparatus for practicing the process of production of a headrest 1 with articulated insert, shown in Figure of the accompanying drawings, which apparatus is principally constituted by a structure 12 movable in at least one given direction, namely parallel to the legs 4 of an insert 5 of a headrest 1 disposed on the associated holding support 11, and comprising two articulated arms 13 each provided at one of their ends with heating elements 2 connected to an electrical source.

The movement of the movable structure 12 is effected along an axis parallel to the legs 4 of the insert 5 by mechanical means such as for example an endless screw, or hydraulic or pneumatic means such as, for example, a screw device or the like.

As shown in FIG. 2 of the accompanying drawings, the heating elements 2 are preferably in the form of rigid loops 14, formed by bending successive elements of heating wire 15 and comprising portions 16 of V-shape used as heating blades.

The particular shape of the heating blades 5 permits hollowing out the swinging spaces 3 by simple translation of said heating elements along the legs 4 of the articulated insert 5.

According to a supplemental characteristic of the invention, shown in FIG. 3 of the accompanying drawings, the heating wire 15 constituting loops 14 consists of a steel wire of circular cross section and of a diameter of about 2 mm, the heating blades 16 of V-shape having a rectangular cross section of a thickness of about 0.5 mm and a width of about 2 mm.

The dimensioning of the heating blades 16, obtained by consecutive flattening and machining of a corresponding portion of the steel wire 15, facilitates the penetration of these latter into the body of the headrest 1, during hollowing out of the swinging spaces 3.

As a result, the production process according to the invention permits providing a headrest 1 with articulated insert, by casting in situ a mixture of polyurethane foam 7, without having recourse to the use of protective frames 10.

FIGS. 4 and 5 of the accompanying drawings show respectively, on the one hand, a headrest 1 with articulated insert 5 produced according to the production process of the invention, and, on the other hand, a headrest 1' with articulated insert according to the prior art and provided with protective frames 10.

Of course, the invention is not limited to the embodiment described and shown in the accompanying drawings. Modifications remain possible, particularly from a standpoint of the nature of the various elements or by substitution of technical equivalents, without thereby departing from the scope of protection of the invention.

What is claimed is:

1. Process for the production of a headrest with an articulated insert, comprising casting in situ polyurethane foam (7) within an external cover in which is disposed an insert (5) having articulated legs (4) that protrude from the cover, then hollowing out, by means of heating elements (2), swinging spaces (3) for the articulated legs (4) of the insert (5) by hot fusion of the external cover (6) and of the polyurethane foam (7) at the corresponding locations (8) of the headrest (1), and simultaneously heat sealing the external cover (6) and the surface of the polyurethane foam (7) bordering said swinging spaces (3).

2. Process according to claim 1, comprising positioning the headrest (1) on a holding support (11), such that the locations (8) to be hollowed out will be accessible, then bringing the heating elements (2) to a temperature permitting hot fusion, inserting said heating elements (2) into the headrest (1) at said locations (8) to a predetermined depth to be hollowed out, withdrawing the heating elements (2) when the predetermined depth is achieved, and removing the headrest (1) thus produced from the holding support (11).

3. Process according to claim 2, wherein the speed of penetration of the heating elements (2) is about 1 cm/sec. and the speed of withdrawal of said elements (2) is about 10 cm/sec., the heating elements (2) being held at a temperature of about 280° C. for hot fusion.

* * * * *